United States Patent
Oishi et al.

(10) Patent No.: US 12,235,372 B2
(45) Date of Patent: Feb. 25, 2025

(54) CONTROL DEVICE, CONTROL SYSTEM, AND PROGRAM

(71) Applicant: KABUSHIKI KAISHA TOKAI RIKA DENKI SEISAKUSHO, Aichi (JP)

(72) Inventors: Yoshiki Oishi, Aichi (JP); Satoshi Mori, Aichi (JP); Kenichi Koga, Aichi (JP); Tatsuya Koike, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 374 days.

(21) Appl. No.: 17/907,803

(22) PCT Filed: Feb. 1, 2021

(86) PCT No.: PCT/JP2021/003507
§ 371 (c)(1),
(2) Date: Aug. 29, 2022

(87) PCT Pub. No.: WO2021/250929
PCT Pub. Date: Dec. 16, 2021

(65) Prior Publication Data
US 2023/0136023 A1    May 4, 2023

(30) Foreign Application Priority Data

Jun. 11, 2020  (JP) ................. 2020-101430

(51) Int. Cl.
*G01S 5/02*    (2010.01)
*E05B 49/00*   (2006.01)

(52) U.S. Cl.
CPC .......... *G01S 5/0221* (2013.01); *G01S 5/0244* (2020.05); *E05B 49/00* (2013.01)

(58) Field of Classification Search
CPC ....... G01S 5/0221; G01S 5/0244; E05B 49/00
See application file for complete search history.

(56) References Cited

U.S. PATENT DOCUMENTS 11,585,915 B2 * 2/2023 Oishi ................. H04B 7/0456
11,740,317 B2 * 8/2023 Oishi ................. G01S 5/0284
                                                 455/456.1
(Continued)

FOREIGN PATENT DOCUMENTS

CN    118089699 A  *  5/2024
JP    2017-173256      9/2017
(Continued)

OTHER PUBLICATIONS

International Search Report issued in International Bureau of WIPO Patent Application No. PCT/JP2021/003507, dated Apr. 13, 2021, along with an English translation thereof.

*Primary Examiner* — Adam D Houston
(74) *Attorney, Agent, or Firm* — GREENBLUM & BERNSTEIN, P.L.C.

(57) ABSTRACT

A control device includes a control section configured to obtain a distance measurement value, and estimate a relative position of a position changeable type communication device with respect to a target space based on the distance measurement value, the distance measurement value being obtained when at least one of a plurality of position fixed type communication devices and the position changeable type communication device perform wireless communication, and indicating a distance between the at least one position fixed type communication device and the position changeable type communication device, the plurality of position fixed type communication devices including a first position fixed type communication device that is fixed inside a target space and to at least one part included in the target space, and a second position fixed type communication device that is fixed to a part different from the at least one part.

17 Claims, 4 Drawing Sheets

(56) References Cited

U.S. PATENT DOCUMENTS

| | | | |
|---|---|---|---|
| 11,765,684 B2* | 9/2023 | Oishi | H04W 48/18 |
| | | | 455/456.1 |
| 2018/0288569 A1 | 10/2018 | Wang | |
| 2019/0375372 A1 | 12/2019 | Sanji et al. | |
| 2021/0258085 A1* | 8/2021 | Oishi | H04B 17/318 |
| 2022/0057472 A1* | 2/2022 | Oishi | G01S 11/02 |
| 2022/0057502 A1* | 2/2022 | Oishi | G01S 13/765 |
| 2022/0061019 A1* | 2/2022 | Oishi | H04W 48/18 |
| 2022/0244339 A1* | 8/2022 | Oishi | G01S 3/46 |
| 2022/0256494 A1* | 8/2022 | Hasegawa | H04W 64/00 |
| 2023/0060556 A1* | 3/2023 | Oishi | G01S 5/0278 |
| 2023/0065313 A1* | 3/2023 | Oishi | G01S 3/10 |
| 2023/0067707 A1* | 3/2023 | Oishi | G01S 3/043 |
| 2023/0135195 A1* | 5/2023 | Song | G01S 5/0205 |
| | | | 342/385 |
| 2023/0243914 A1* | 8/2023 | Oishi | G01S 5/0244 |
| | | | 342/451 |
| 2023/0249033 A1* | 8/2023 | Son | A61B 5/681 |
| | | | 482/9 |
| 2024/0094326 A1* | 3/2024 | Yoon | G01S 5/02521 |

FOREIGN PATENT DOCUMENTS

| | | | | |
|---|---|---|---|---|
| JP | 2018-141771 A | 9/2018 | | |
| JP | 2019-70258 A | 5/2019 | | |
| WO | 2015/176776 A1 | 11/2015 | | |
| WO | WO-2020080180 A1 * | 4/2020 | | G01S 5/06 |
| WO | WO-2021250927 A1 * | 12/2021 | | B60R 25/24 |

* cited by examiner

CONTROL DEVICE, CONTROL SYSTEM, AND PROGRAM

TECHNICAL FIELD

The present invention relates to a control device, a control system, and a program.

BACKGROUND ART

In recent years, a technology where one device estimates a position of an other device according to a result of transmission/reception of a signal between the devices has been developed. As an example of a position estimation technology, following Patent Literature 1 discloses a technology where a UWB receiver estimates an arrival angle of a wireless signal from a UWB transmitter by performing wireless communication using an Ultra-Wide Band (UWB). Furthermore, in another example of the position estimation technology, a distance between devices is measured by performing wireless communication, and position estimation is performed by using the distance.

CITATION LIST

Patent Literature

Patent Literature 1: WO 2015/176776

SUMMARY OF INVENTION

Technical Problem

However, there has been a task that, when there is a shield between devices, communication is not performed well, and measurement precision of a target that needs to be measured deteriorates as a result.

Accordingly, the present invention is made in view of the aforementioned issue, and an object of the present invention is to provide a mechanism that can improve position estimation precision.

Solution to Problem

To solve the above problem, according to an aspect of the present invention, there is provided a control device comprising a control section configured to obtain a distance measurement value, and estimate a relative position of a position changeable type communication device with respect to a target space based on the distance measurement value, the distance measurement value being obtained when at least one of a plurality of position fixed type communication devices and the position changeable type communication device perform wireless communication, and indicating a distance between the at least one position fixed type communication device and the position changeable type communication device, the plurality of position fixed type communication devices including a first position fixed type communication device that is fixed inside a target space that is a space partitioned by an object and to at least one part included in the target space, and a second position fixed type communication device that is fixed to a part different from the at least one part, and the relative position of the position changeable type communication device with respect to the target space being changeable.

To solve the above problem, according to another aspect of the present invention, there is provided a control system comprising a plurality of position fixed type communication devices that include a first position fixed type communication device and a second position fixed type communication device, the first position fixed type communication device being fixed inside a target space that is a space partitioned by an object and to at least one part included in the target space, and the second position fixed type communication device being fixed to a part different from the at least one part; and a control device configured to obtain a distance measurement value, and estimate a relative position of a position changeable type communication device with respect to a target space based on the distance measurement value, the distance measurement value being obtained when at least one of the position fixed type communication devices and the position changeable type communication device perform wireless communication, and indicating a distance between the at least one position fixed type communication device and the position changeable type communication device, and the relative position of the position changeable type communication device with respect to the target space being changeable.

To solve the above problem, according to another aspect of the present invention, there is provided a program causing a computer to function as a control section configured to obtain a distance measurement value, and estimate a relative position of a position changeable type communication device with respect to a target space based on the distance measurement value, the distance measurement value being obtained when at least one of a plurality of position fixed type communication devices and the position changeable type communication device perform wireless communication, and indicating a distance between the at least one position fixed type communication device and the position changeable type communication device, the plurality of position fixed type communication devices including a first position fixed type communication device that is fixed inside a target space that is a space partitioned by an object and to at least one part included in the target space, and a second position fixed type communication device that is fixed to a part different from the at least one part, and the relative position of the position changeable type communication device with respect to the target space being changeable.

Advantageous Effects of Invention

As described above, the present invention can improve position estimation precision.

DESCRIPTION OF EMBODIMENTS

Figure 1:
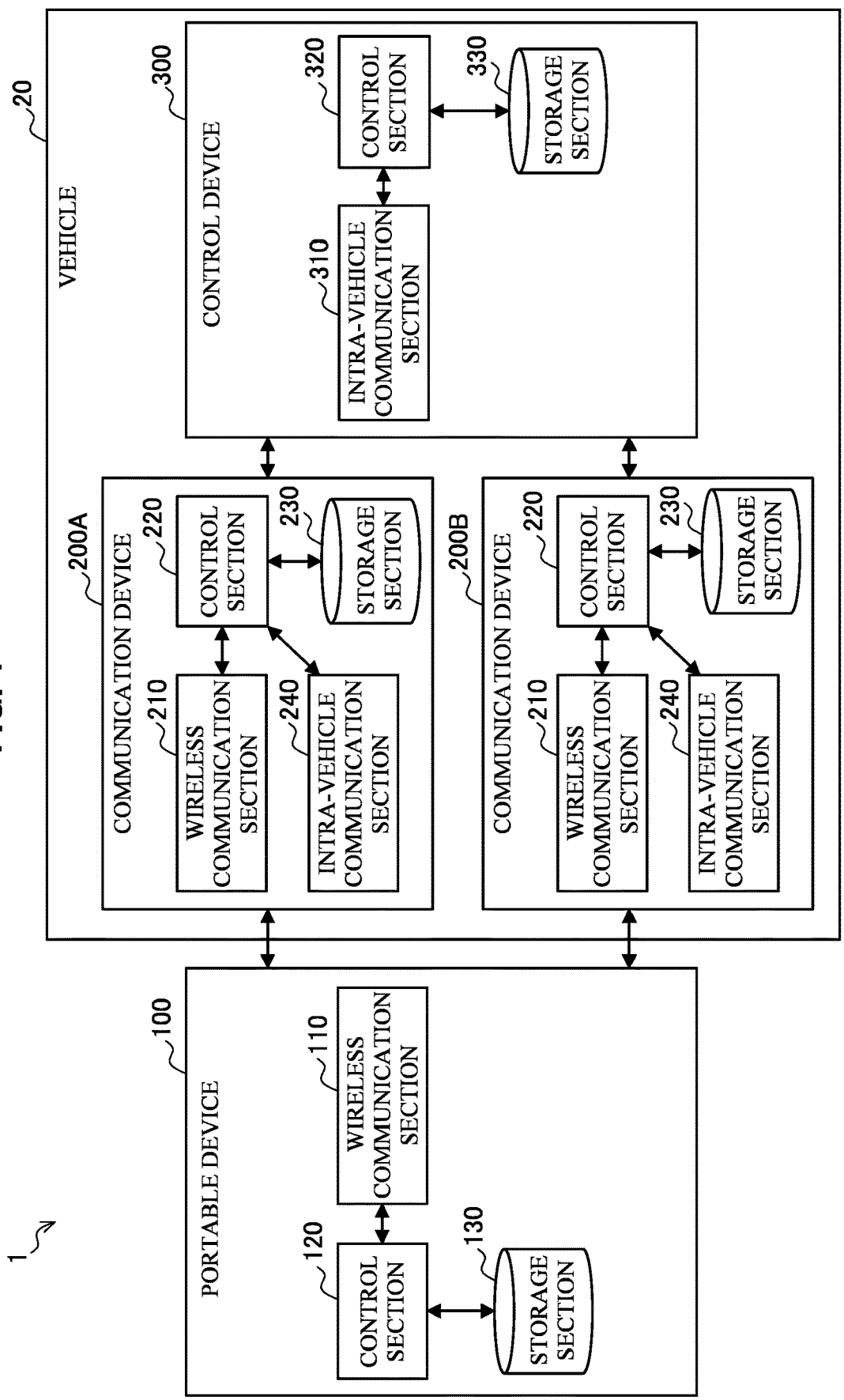
FIG. 1 is a diagram illustrating an example of a configuration of a system according to an embodiment of the present invention.

A preferred embodiment of the present invention will be described in detail below with reference to the accompanying drawings. Note that components employing substantially identical functional configurations will be assigned the same reference numerals in this description and the drawings, and overlapping description thereof will be omitted.

Furthermore, components employing substantially same functional configurations will be assigned different alphabets at tails of the same reference numerals and distinguished in this description and the drawings in some cases. For example, a plurality of components employing the substantially same functional configurations are distinguished as communication devices 200A and 200B as needed. In this regard, in a case where each of the plurality of components employing the substantially same functional configurations does not need to be distinguished in particular, each component will be assigned the same reference numeral. In a case where, for example, the communication device 200A and 200B do not need to be distinguished in particular, the communication device 200A and 200B will be referred to simply as a communication device 200.

«1. Outline»

FIG. 1 is a diagram illustrating an example of a configuration of a system 1 according to an embodiment of the present invention. As illustrated in FIG. 1, the system 1 according to the present embodiment includes a portable device 100, the communication device 200 that is mounted on a vehicle 20, and a control device 300. The vehicle 20 is an example of a movable body that is a use target (target) of a user.

An authenticatee side device and an authentication side device that performs an authentication process of authenticating the device by using information obtained by communicating with the authenticatee device are involved in the present invention. In an example illustrated in FIG. 1, the portable device 100 is an example of the authenticatee side device, and the control device 300 is an example of the authentication side device.

According to the system 1, when, for example, the user who is a driver of the vehicle 20 approaches the vehicle 20 carrying the portable device 100, the portable device 100 and the communication device 200 perform wireless communication for authentication. Furthermore, when the control device 300 performs the authentication process by using the information obtained by the communication device 200, and authentication succeeds, a door lock of the vehicle 20 is unlocked, a light is turned on, or an engine is started under control of the control device 300, and the vehicle 20 becomes available for the user. This system 1 is also referred to as a smart entry system. Each component will be described below in order.

<1.1. Portable Device 100>

The portable device 100 is configured as an arbitrary control device. An example of the arbitrary control device includes devices such as electronic keys, smartphones, and wearable terminals that a user of a movable body carries to use. As illustrated in FIG. 1, the portable device 100 includes a wireless communication section 110, a control section 120, and a storage section 130.

(Wireless Communication Section 110)

The wireless communication section 110 has a function of performing communication that conforms to predetermined wireless communication standards with the communication device 200. The predetermined wireless communication standards may use, for example, a signal of a Radio Frequency (RF) band and a signal of a Low Frequency (LF) band. Alternatively, a signal of Bluetooth Low Energy (BLE (registered trademark)) may be transmitted. Alternatively, a signal that uses the Ultra-Wide Band (UWB) may be used.

Note a signal of an impulse system that uses the UWB has characteristics of making it possible to perform precise distance measurement. That is, the signal of the impulse system that uses UWB makes it possible to precisely measure an air propagation time of a radio wave by using the radio wave of a very short pulse width equal to or less than a nano second, and perform precise distance measurement based on the propagation time. The air propagation time is a time taken until a radio wave is received after the radio wave is transmitted. In this regard, distance measurement refers to measuring a distance between devices that transmit and receive a signal. The wireless communication section 110 is configured as, for example, an interface that can transmit and receive a signal that uses the UWB.

Note that the signal that uses the UWB can be transmitted as, for example, a distance measurement signal, an angle estimation signal, and a data signal. The distance measurement signal is a signal that is transmitted and received during a distance measurement process described below. The distance measurement signal may include a frame format that does not have a payload part in which data is stored, or may include, for example, a frame format that has a payload part. The angle estimation signal is a signal that is transmitted and received during an angle estimation process described below. The angle estimation signal may employ the same configuration as that of the distance measurement signal. A data signal preferably includes, for example, a frame format that has a payload part in which data is stored.

In this regard, the wireless communication section 110 includes at least one antenna. Furthermore, the wireless communication section 110 transmits and receives a wireless signal via at least one antenna.

(Control Section 120)

The control section 120 has a function of controlling all operations of the portable device 100. In an example, the control section 120 controls the wireless communication section 110, and communicates with the communication device 200. Furthermore, the control section 120 reads information from the storage section 130, and writes information in the storage section 130. The control section 120 is configured as an electronic circuit such as a Central Processing Unit (CPU) and a microprocessor.

(Storage Section 130)

The storage section 130 has a function of storing various pieces of information for the operations of the portable device 100. For example, the storage section 130 stores programs for the operations of the portable device 100, and an Identifier (ID), a password, and an authentication algorithm for authentication. The storage section 130 includes, for example, a storage medium such as a flash memory, and a processing device that executes recording and playback with respect to a storage medium.

The configuration example of the portable device 100 has been specifically described above. Note that the configuration illustrated in FIG. 1 is an example, and the configuration of the portable device 100 is not limited to this. For example, the portable device 100 may employ a configuration further including, for example, an operation section that accepts a user's operation of the portable device 100, a sensor section that detects a motion of the portable device 100 and sounds in surroundings, a sound output section that outputs a sound, or a vibration section that vibrates the portable device 100.

<1.2. Communication Device 200 and Control Device 300>

The communication device 200 and the control device 300 are provided in association with the vehicle 20. In this regard, the communication device 200 is, for example, installed inside a vehicle compartment of the vehicle 20 or built in the vehicle 20 as a communication module, that is, the communication device 200 is mounted on the vehicle 20. In addition, for example, the control device 300 may be provided in a parking lot of the vehicle 20, that is, the vehicle 20 and the control device 300 may be configured as separate devices. In this case, the control device 300 can wirelessly transmit a control signal to the vehicle 20 based on a communication result of the portable device 100 and the communication device 200, and remotely control the vehicle 20. The vehicle 20 may be provided with the plurality of communication devices 200.

(Communication Device 200)

The communication device 200 is a device that performs wireless communication with the portable device 100. As illustrated in FIG. 1, the communication device 200 includes a wireless communication section 210, a control section 220, a storage section 230, and an intra-vehicle communication section 240. Furthermore, other communication devices 200 such as the communication device 200B have the components similar to the communication device 200A.

The wireless communication section 210 has a function of performing communication that conforms to predetermined wireless communication standards with the wireless communication section 110 of the portable device 100. The wireless communication section 210 wirelessly receives a signal from the portable device 100. Furthermore, the wireless communication section 210 wirelessly transmits a signal to the portable device 100. The wireless communication section 210 is configured as, for example, a communication interface that can perform communication using the UWB.

In this regard, the wireless communication section 210 includes at least one antenna. Furthermore, the wireless communication section 210 transmits and receives wireless signals via the at least one antenna.

The control section 220 has a function of controlling operations of the communication device 200. In an example, the control section 220 controls the wireless communication section 210, and communicates with the portable device 100. In another example, the control section 220 controls the intra-vehicle communication section 240, and communicates with another device provided in association with the vehicle 20. In another example, the control section 220 reads information from the storage section 230, and writes information in the storage section 230. The control section 220 is configured as, for example, an Electronic Control Unit (ECU).

The storage section 230 has a function of storing various pieces of information for operations of the communication device 200. For example, the storage section 230 stores programs for the operations of the communication device 200, and an Identifier (ID), a password, and an authentication algorithm for authentication. The storage section 230 includes, for example, a storage medium such as a flash memory, and a processing device that executes recording and playback with respect to a storage medium.

The intra-vehicle communication section 240 has a function of communicating with another device provided in association with the vehicle 20. In an example, the intra-vehicle communication section 240 communicates with the control device 300. The intra-vehicle communication section 240 is configured as a communication interface that can perform communication that conforms to standards of an arbitrary in-vehicle network such as a Local Interconnect Network (LIN) or a Controller Area Network (CAN).

(Control Device 300)

The control device 300 is a device that executes communication with the communication device 200. The control device 300 is a device that performs communications between the communication devices. As illustrated in FIG. 1, the control device 300 includes an intra-vehicle communication section 310, a control section 320, and a storage section 330.

The intra-vehicle communication section 310 has a function of communicating with another device provided in association with the vehicle 20. In an example, the intra-vehicle communication section 310 communicates with the communication device 200. The intra-vehicle communication section 310 is configured as a communication interface that can perform communication that conforms to standards of an arbitrary in-vehicle network such as a Local Interconnect Network (LIN) or a Controller Area Network (CAN).

The control section 320 has a function of controlling operations of the control device 300. In an example, the control section 320 controls the intra-vehicle communication section 310, and communicates with the another device provided in association with the vehicle 20. In another example, the control section 320 reads information from the storage section 330, and writes information in the storage section 330. The control section 320 is configured as, for example, an electronic circuit such as an Electronic Control Unit (ECU).

Above all, the control section 320 executes a process that is based on information obtained by wireless communication between the each of the communication devices 200 and the portable device 100. An example of the process is an authentication process of authenticating the portable device 100. Furthermore, in another example of the process, the control section 320 functions as a door lock control section, too, that controls the door lock of the vehicle 20, and locks and unlocks the door lock. Furthermore, in another example of the process, the control section 320 functions as an engine control section, too, that controls the engine of the vehicle 20, and starts/stops the engine. Note that a power supply equipped to the vehicle 20 may be, for example, a motor in addition to the engine. Furthermore, in another example of the process, the control section 320 performs control to turn on and turn off lights provided to the vehicle 20. Furthermore, in another example of the process, the control section 320 performs control to start/stop electric power distribution to predetermined electric components provided to the vehicle 20. The predetermined electric components include, for example, air conditioners, car audios, and car navigation devices.

The storage section 330 has a function of storing various pieces of information for the operations of the control device 300. For example, the storage section 330 stores programs for the operations of the control device 300, and an Identifier (ID), a password, and an authentication algorithm for authentication. The storage section 330 includes, for example, a storage medium such as a flash memory, and a processing device that executes recording and playback with respect to a storage medium.

The example of the configuration of this system 1 has been specifically described above. Note that a wireless signal transmitted and received between the portable device 100 and the each of the communication devices 200 is transmitted and received in an arbitrary frequency band. The wireless signal is not limited to a signal that uses the UWB, and, for example, may be transmitted as a signal of a Low Frequency (LF) band, may be transmitted as a signal of a Radio Frequency (RF) band, or may be transmitted as a signal of Bluetooth Low Energy (BLE (registered trademark)). Furthermore, the portable device 100 and the communication devices 200 may further include wireless communication sections that transmit and receive wireless signals by communication of a different frequency band in addition to the wireless communication sections that transmit and receive signals that use the UWB.

«2. Estimation of Position Parameters»

The control device 300 according to the present embodiment performs an estimation process of estimating position parameters that indicate a position at which the portable device 100 exists.

The position parameters can include a distance between the portable device 100 and each communication device 200 that is mounted on the vehicle 20. The distance is, for example, a distance from an origin of a local coordinate system of the communication device 200 to the portable device 100. In the present embodiment, the local coordinate system of the communication device 200 may be set as a coordinate system in which the communication device 200 serves as a reference point. The communication device 200 includes a plurality of antennas. An example of the local coordinate system of the communication device 200 is a coordinate system where a center of the plurality of antennas of the communication device 200 is the origin, a front-back direction of the vehicle 20 is an X axis, a left-right direction of the vehicle 20 is a Y axis, and an upper-lower direction of the vehicle 20 is a Z axis. An arrangement shape of the plurality of antennas is not limited in particular.

A distance between the portable device 100 and each communication device 200 is estimated based on a below-described result of transmission and reception of a distance measurement signal performed between the portable device 100 and the communication device 200.

Furthermore, the position parameters can include an angle at which a signal transmitted from the portable device 100 arrives at each communication device 200. The angle is an angle of the portable device 100 for which the communication device 200 serves as the reference point. For example, the angle is an angle formed between a straight line that connects the origin of the local coordinate system of the communication device 200 and the portable device 100, and the coordinate axes of the local coordinate system.

Furthermore, the position parameters can include coordinates of the portable device 100 in a predetermined coordinate system. The predetermined coordinate system may be the local coordinate system of the communication device 200. For example, a coordinate x on the X axis, a coordinate y on the Y axis, and a coordinate z on the Z axis in the local coordinate system indicate three-dimensional coordinates (x, y, z) of the portable device 100.

<2.1. Distance Measurement Process>

The control device 300 performs a distance measurement process. The distance measurement process is a process of estimating a distance between each communication device 200 and the portable device 100. The distance measurement process includes transmitting and receiving a distance measurement signal, and calculating a distance R based on an air propagation time of the distance measurement signal. The air propagation time is a time taken until a signal is received after the signal is transmitted. The control device 300 can obtain, from each communication device 200, information obtained when each communication device 200 and the portable device 100 communicate, and perform the distance measurement process that calculates the distance between each communication device and the portable device 100.

During the distance measurement process, a plurality of distance measurement signals can be transmitted and received between each of the plurality of communication devices 200 and the portable device 100. A distance measurement signal transmitted from one device to an other device among the plurality of distance measurement signals is also referred to as a first distance measurement signal. Next, a distance measurement signal transmitted as a response to the first distance measurement signal from the device that has received the first distance measurement signal to the device that has transmitted the first distance measurement signal is also referred to as a second distance measurement signal.

An example of the distance measurement process will be described. For example, the portable device 100 first transmits a distance measurement trigger signal that instructs start of distance measurement. Next, the communication device 200 that has received the distance measurement trigger signal transmits the first distance measurement signal. Next, the portable device 100 that has received the first distance measurement signal transmits the second distance measurement signal a specified time ($\Delta T1$) after receiving the first distance measurement signal. The communication device 200 measures a time $\Delta T1$ from a transmission time of the first distance measurement signal to a reception time of the second distance measurement signal. The reception time of the second distance measurement signal is a reception time of a first arrival wave of the second distance measurement signal. The control device 300 calculates the distance between the portable device 100 and the communication device 200 based on known $\Delta T1$ and measured $\Delta T2$. More specifically, the control device 300 calculates a time taken for one-way transmission/reception of a signal by dividing by 2 a value obtained by subtracting $\Delta T1$ from $\Delta T2$, and calculates the distance between the portable device 100 and the communication device 200 by multiplying this time with a signal speed. Note that the time $\Delta T1$ may not be known for the control device 300. For example, the portable device 100 may measure the time $\Delta T1$, and report the time $\Delta T1$ to the communication device 200. This report can be performed by transmitting a data signal including information obtained by encrypting information that indicates the time $\Delta T1$.

<2.2. Angle Estimation>

The control device 300 performs an angle estimation process. For example, the angle estimation process includes receiving an angle estimation signal, and calculating an angle based on a reception result of the angle estimation signal. The angle estimation signal is a signal that is transmitted and received by the angle estimation process.

First, the portable device 100 transmits the angle estimation signal. Next, the wireless communication section 210 of the communication device 200 receives the angle estimation signal. The control section 320 of the control device 300 estimates an Angle of Arrival (AoA) based on the angle estimation signal received by the wireless communication section 210.

Supplementary Explanation

Note that the angle estimation signal may be the same as the distance measurement signal. In this case, when each of the plurality of communication device 200 receives one wireless signal that functions as both of the angle estimation signal and the second distance measurement signal, the control device 300 can calculate the distance between each communication device 200 and the portable device 100 and the angle of the portable device 100 with respect to each communication device 200.

<2.3. Coordinate Estimation>

The control device 300 performs a coordinate estimation process. The coordinate estimation process is a process of estimating three-dimensional coordinates (x, y, z) of the portable device 100. The control device 300 calculates the coordinates x, y, and z based on, for example, results of the distance measurement process and the angle estimation process. The control device 300 calculates the coordinates x, y, and z of the portable device 100 based on obtained information of the plurality of communication devices 200. The distance measurement process and the angle estimation process may be each performed by each communication device 20.

Note that, by combining coordinates of the portable device 100 in the local coordinate system and coordinates of the origin of the local coordinate system in a global coordinate system, it is also possible to estimate the coordinates of the portable device 100 in the global coordinate system, too.

<2.4. Decision on Existence Area>

Estimation of the position parameters includes deciding an existence area. The control section 320 of the control device 300 can decide an area in which the portable device 100 exists among a plurality of areas defined in advance. In an example, in a case where an area is defined based on a distance from the communication device 200, the control section 320 decides the area in which the portable device 100 exists based on the distance estimated by the distance measurement process. In another example, in a case where an area is defined by an angle from the communication device 200, the control section 320 decides the area in which the portable device 100 exists based on the angle estimated by the angle estimation process. In another example, in a case where an area is defined by three-dimensional coordinates, the control section 320 decides the area in which the portable device 100 exists based on the coordinates (x, y, z) estimated by the coordinate estimation process.

Additionally, as a process unique to the vehicle 20, the control section 320 may estimate an area in which the portable device 100 exists from a plurality of areas including an inside of the vehicle compartment and an outside of the vehicle compartment of the vehicle 20. For example, the control section 320 may decide in which one area of the inside of the vehicle compartment and the outside of the vehicle compartment of the vehicle 20 the portable device 100 exists. Consequently, it is possible to provide different services between a case where the user is inside the vehicle compartment and a case where the user is outside the vehicle compartment. Additionally, the control section 320 may specify the area in which the portable device 100 exists from a surrounding area that is an area within a predetermined distance from the vehicle 20 and a distant area that is an area that is the predetermined distance or more from the vehicle 20.

<2.5 Usage of Estimation Result of Position Parameters>

The estimation result of the position parameters can be used to, for example, authenticate the portable device 100. When, for example, the portable device 100 exists in an area on a driver's seat side and at a close distance from the communication device 200, the control section 320 decides success of authentication, and unlocks the door. Furthermore, when the portable device exists in an intra-vehicle compartment area, the control section 320 decides success of authentication, and permits to start the engine.

«3. Technical Task»

Figure 2:
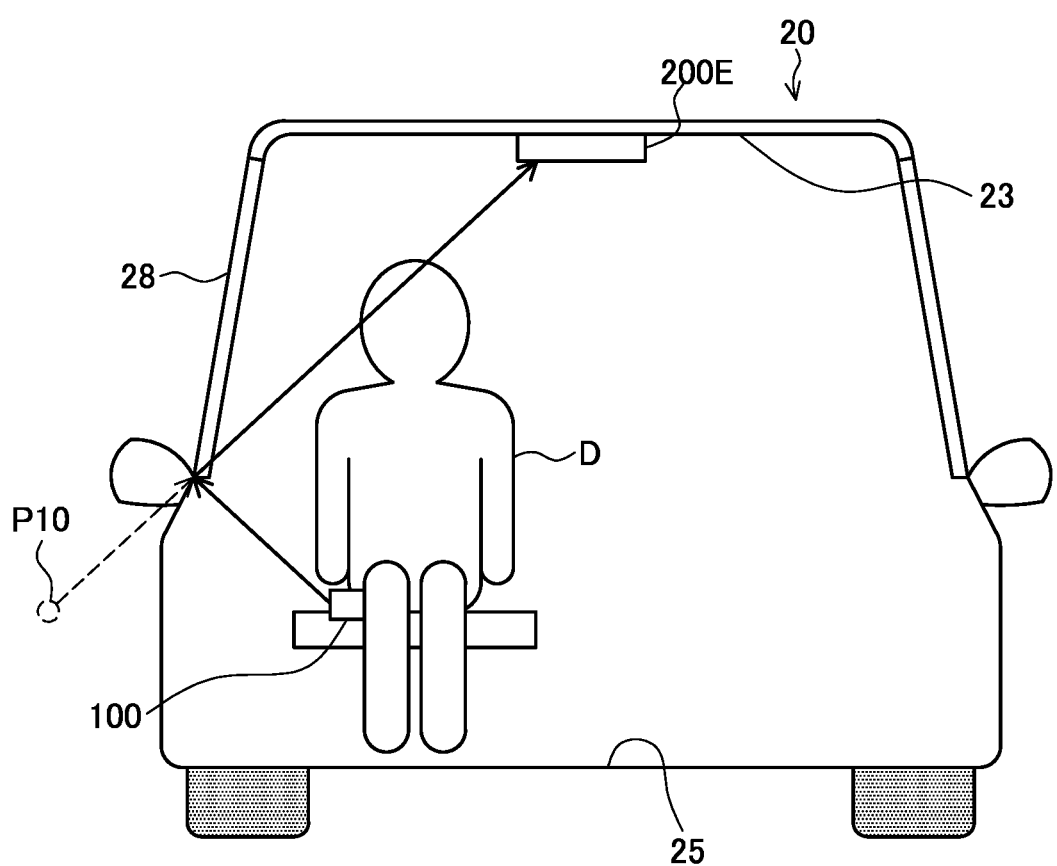
FIG. 2 is a view for explaining a technical task according to the present embodiment.

A technical task of the present embodiment will be described with reference to FIG. 2. FIG. 2 is a view for explaining the technical task of the present embodiment. As illustrated in FIG. 2, the vehicle 20 includes a ceiling part 23 and a floor part 25. Furthermore, a side surface part that connects the ceiling part and the floor part 25 is provided with a glass window 28.

A communication device 200E is installed inside the vehicle compartment of the vehicle 20. The communication device 200E employs the substantially same functional configuration as that of the communication device 200 according to the present embodiment illustrated in FIG. 1. As illustrated in FIG. 2, the communication device 200E is arranged at the ceiling part 23. By installing the communication device 200E at the ceiling part 23, it is possible to estimate the position of the portable device 100 in a wide range inside and outside the vehicle compartment.

In this regard, there is a case where a direct wave from the portable device 100 is shielded by other objects such as human bodies and baggage such a case where the portable device 100 is put in a back pocket of a user D who gets on the vehicle 20. In this case, a reflected wave that is the signal transmitted from the portable device 100 and reflected inside the vehicle compartment arrives at the communication device 200E arranged at the ceiling part 23. Hence, position estimation is performed based on the reflected wave.

More specifically, according to a distance measurement process of calculating a distance between the above-described portable device 100 and communication device 200E, the time $\Delta T2$ from a transmission time of the first distance measurement signal to a reception time of the second distance measurement signal is measured, and the reception time of the second distance measurement signal is a reception time of a first arrival wave of the second distance measurement signal. The first arrival wave can be one of a direct wave, a delay wave, and a synthetic wave. The direct wave is a signal that is received by a reception side directly (that is, without being reflected or diffracted) via a shortest route of transmission and reception. The delay wave is a signal that is received by the reception side via a route of transmission and reception that is not the shortest, that is, indirectly by being reflected and diffracted. The delay wave is delayed compared to the direct wave, and is received by the reception side. The synthetic wave is a signal that is received by the reception side in a state where a plurality of signals having passed through a plurality of different routes are synthesized.

Therefore, the signal detected as the first arrival wave is not necessarily the direct wave. When the direct wave is shielded by a human body and the reflected wave is detected as the first arrival wave as described above, above measured $\Delta T2$ includes a delay time. When $\Delta T2$ is measured at a reception time of this delay wave, and a distance measurement process is performed by using this $\Delta T2$, a wrong distance that is longer than an actual distance is calculated. Furthermore, when the above-described angle estimation process is performed based on the delay wave, too, a wrong angle is calculated. Hence, it is concerned that, for example, coordinates P10 illustrated in FIG. 2 are estimated as coordinates of the portable device 100, and it is wrongly decided that the portable device 100 exists outside the vehicle compartment. In this way, shielding caused by a human body becomes a cause of a decrease in precision of position parameter estimation of the portable device 100.

Hence, it is desirable that, even when the portable device 100 is put in a pocket of clothes or baggage inside the vehicle compartment, and a signal is shielded by the human body or the baggage, it is possible to more accurately estimate a position.

«4. Technical Feature»

Even when the portable device 100 is put in the pocket of clothes or the baggage inside the vehicle compartment according to an arrangement of the plurality of communication devices 200 described in detail below, the control device 300 can detect a direct wave as a first incoming wave. A case where a subject that detects the first incoming wave is at least one of the plurality of communication devices 200, and the control device 300 performs a process such as position estimation will be described as an example below. A process describe below may be executed by the portable device 100.

<4.1. Arrangement of Communication Devices>

The plurality of communication devices 200 are mounted on the vehicle 20. The communication device 200 is an example of a position fixed type communication device. The position fixed type communication device is a communication device whose relative position with respect to a target space that is a space partitioned by an object is fixed.

The vehicle compartment of the vehicle 20 is an example of the target space. In this regard, the vehicle compartment is a space provided to the vehicle 20 for the user to get on the vehicle 20. In a case where the target space is the vehicle compartment, an example of the object that partitions the target space is a component that makes up an outermost shell of the vehicle 20. The component that makes up the outermost shell of the vehicle 20 is a layer that is the most distant layer seen from the vehicle compartment among components that make up the vehicle compartment. An example of the component that makes up the outermost shell of the vehicle 20 is a steel plate that makes up a body of the vehicle 202, a steel plate that makes up doors, and glass windows that are fitted to the doors. Note that interior parts are applied using a resin to the vehicle compartment side of the steel plate that makes up the body and the steel plate that makes up the doors in some cases. These interior parts are also included in the vehicle compartment. Furthermore, an object that partitions the target space is an example of a part included in the target space.

Figure 3:
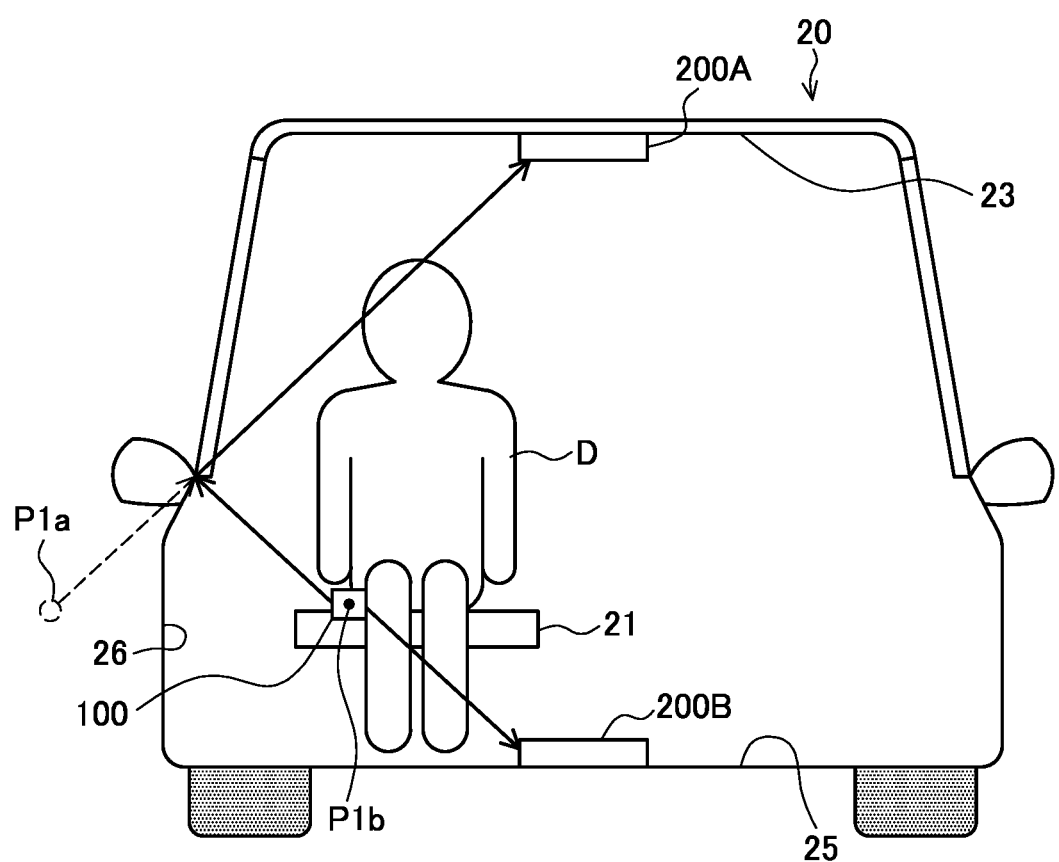
FIG. 3 is a view illustrating an example of an arrangement of a communication device according to the present embodiment.

FIG. 3 is a view illustrating an example of an arrangement of the plurality of communication devices 200 according to the present embodiment. As illustrated in FIG. 3, a traveling direction of the vehicle 20 is also referred to as a front direction, and a direction opposite to the traveling direction of the vehicle 20 is also referred to as a back direction. Furthermore, a direction that is perpendicular to the traveling direction of the vehicle 20 and is horizontal to a ground is also referred to as a left-right direction. Furthermore, a direction that is perpendicular to the traveling direction of the vehicle 20 and is vertical to the ground is also referred to as an upper-lower direction. Furthermore, the vehicle 20 includes the ceiling part 23, the floor part 25, and the side parts as components that make up the outermost shell of the vehicle 20. The ceiling part 23, the floor part 25, and the side parts are examples of parts included in the vehicle compartment. Furthermore, the side parts include a side part 26 on the driver's seat side, a side part on a passenger's seat side, a side part on a front side of the vehicle 20, and a side part on a rear side of the vehicle 20. The side parts include door parts of the vehicle 20. Furthermore, the side parts may include window pillars (so-called pillars) of the vehicle 20.

In this regard, according to the present embodiment, a first position fixed type communication device among a plurality of position fixed type communication devices is fixed to at least one part included in the target space, and a second position fixed type communication device is fixed to a part different from the part to which the first position fixed type communication device. According to this arrangement, when the direct wave from the portable device 100 arrives at least one of the first position fixed type communication device and the second position fixed type communication device, it is possible to correctly estimate the coordinates of the portable device 100, and precision of position estimation improves. An example of the first position fixed type communication device is the communication device 200A illustrated in FIG. 3. Furthermore, an example of the second position fixed type communication device is the communication device 200B illustrated in FIG. 3. Note that the portable device 100 is an example of a position changeable type communication device. The position changeable type communication device is a communication device whose relative position with respect to the target space is changeable. The portable device 100 is carried by the user, and moves as the user moves. For example, the portable device 100 can be located inside the vehicle compartment or located outside the vehicle compartment.

The control device 300 can estimate a position of a position changeable type communication device based on a distance measurement value and an angle that are obtained when at least one of the plurality of position fixed type communication devices including the first position fixed type communication device and the second position type communication device, and the position changeable type communication device perform wireless communication, and that indicate a distance between the at least one position fixed type communication device and the position changeable type communication device. More specifically, when at least one or more estimation results estimate that the position of the position changeable type communication device is inside the target space, the control device 300 decides that the position changeable type communication device is located inside the target space.

When the portable device 100 is put in a back pocket of a user D who gets on the vehicle 20 as illustrated in, for example, FIG. 3, a direct wave from the portable device 100 to the communication device 200A is shielded by a human body. A reflected wave that is the signal transmitted from the portable device 100 and reflected inside the vehicle compartment arrives at the communication device 200A. For example, the signal is reflected by the side part 26 on the driver's seat side. Hence, the control device 300 performs position estimation based on the reflected wave, estimates a wrong distance and angle, estimates coordinates P1a illustrated in FIG. 3 as coordinates of the portable device 100, and wrongly decides that the portable device 100 exists outside the vehicle compartment. On the other hand, the direct wave from the portable device 100 arrives at the communication device 200B that is arranged at a place different from an arrangement place of the communication device 200A such as a lower direction of a seat part 21 without being shielded by a human body. The communication device 200B is arranged at, for example, a floor part 25. Furthermore, although the human body has been cited as an example of a shield, baggage and the like are also assumed. The control device 300 can perform position estimation based on the direct wave, and estimate a correct distance and angle. More specifically, the control device 300 can estimate coordinates P1b illustrated in FIG. 3 as the coordinates of the portable device 100. Consequently, the control device 300 can correctly decide that the portable device 100 exists inside the vehicle compartment. In a case where at least one estimation result of a plurality of position estimation results indicates that the portable device 100 is located inside the vehicle compartment, the control device 300 makes decision as final decision that the portable device 100 is located inside the vehicle compartment. Furthermore, in a case where estimation results of all of the plurality of position estimation results indicate that the portable device 100 is located outside the vehicle compartment, the control device 300 makes decision as final decision that the portable device 100 is located outside the vehicle compartment.

Thus, according to the present embodiment, by arranging the plurality of communication devices 200 respectively at different parts, estimation precision improves, and it is possible to reduce wrong intra/extra-vehicle compartment decision. Even when, for example, a signal propagating in an upper direction of the vehicle compartment is shielded by a human body or baggage, the direct wave from the portable device 100 arrives at at least the communication device 200B arranged in the lower direction of the vehicle compartment. Furthermore, when the portable device 100 is located outside the vehicle compartment, the direct wave from the portable device 100 arrives at at least the communication device 200B arranged in the upper direction of the vehicle compartment. Consequently, even when the portable device 100 is located at one of the inside and the outside of the vehicle compartment, the control section 320 of the control device 300 can estimate position parameters based on the direct wave by at least one of the plurality of position fixed type communication devices, so that estimation precision improves. The control device 300 can more accurately estimate the coordinates of the portable device 100, and appropriately decide in which one of the inside and the outside of the vehicle compartment the portable device 100 exists.

As an example of the arrangement according to the present embodiment, the communication device 200B is fixed to a part that has a perpendicular or facing positional relationship with a part to which the communication device 200A is fixed. In a case where, for example, the part to which the communication device 200A is fixed is the ceiling part 23, an example of the part having the perpendicular positional relationship is the side part 26 on the driver's seat side. Furthermore, an example of the part having the facing positional relationship with the ceiling part 23 is the floor part 25. Hence, when the communication device 200A is arranged at the ceiling part 23, the communication device 200B may be arranged at the side part 26 and the floor part 25. Furthermore, in a case where, for example, the part to which the communication device 200A is fixed is the side part 26, an example of the part having the perpendicular positional relationship is the floor part 25. Furthermore, an example of the part having the facing positional relationship with the side part 26 is the side part on the passenger's seat side. Hence, when the communication device 200A is arranged at the side part 26, the communication device 200B may be arranged at the floor part 25 or the side part on the opposite side. According to this arrangement, the estimation precision further improves, and it is possible to reduce wrong intra/extra-vehicle compartment decision. Note that the side part 26 may be more specifically a door part or a pillar.

Furthermore, in the example of the arrangement according to the present embodiment, the communication device 200A is arranged at a position closer (in terms of a distance) to the ceiling part 23 than to the floor part 25, and the communication device 200B is arranged at a position closer (in terms of a distance) to the floor part 25 than to the ceiling part 23. More restrictively, for example, the communication device 200A may be arranged at the ceiling part 23, and the communication device 200B may be arranged at the floor part 25. Furthermore, the communication device 200B may be arranged between the seat part and the floor part 25. The seat part includes a seat part 21 of the driver's seat, a seat part of a passenger's seat, and seat parts of rear seats. More restrictively, for example, the communication device 200B may be arranged between the seat part 21 of the driver's seat and the floor part 25. Furthermore, the communication device 200B may be arranged on a back side of the seat part 21 of the driver's seat. Furthermore, the communication device 200B may be arranged at a center part in the left-right direction of the floor part 25. Furthermore, the communication device 200B may be arranged at a part closer to one direction of the left and right directions of the floor part 25 (the driver's seat side or the passenger's seat side). Furthermore, the communication device 200B may be arranged at an end part on a front direction side of the floor part 25. Furthermore, the communication device 200B may be arranged at the end part on the front direction side of the floor part 25 and the center part in the left-right direction. Furthermore, when the communication device 200A is arranged at the ceiling part 23, and the communication device 200B is arranged at a side part that connects the ceiling part 23 and the floor part 25, the communication device 200B may be arranged at a height of the side part below the seat part 21. According to this arrangement, the estimation precision further improves, and it is possible to reduce wrong intra/extra-vehicle compartment decision.

Furthermore, in the arrangement example according to the present embodiment, it may be said that the positional relationship of the arrangement of the communication device 200A and the communication device 200B is, for example, a positional relationship that the communication device 200A and the communication device 200B face each other sandwiching the seat part 21 provided to the vehicle 20.

Furthermore, in the arrangement example according to the present embodiment, it may be said that the positional relationship of the arrangement of the communication device 200A and the communication device 200B is, for example, a positional relationship that a straight line that connects the communication device 200A and the communication device 200B passes a specified shield that exists inside the vehicle compartment of the vehicle 20. The specified shield is, for example, a human body, baggage, or a seat part.

According to the above-described arrangement of the plurality of communication devices 200, it is possible to suppress wrong intra/extra-vehicle compartment decision during position estimation of the portable device 100.

<4.2. Flow of Process>

Figure 4:
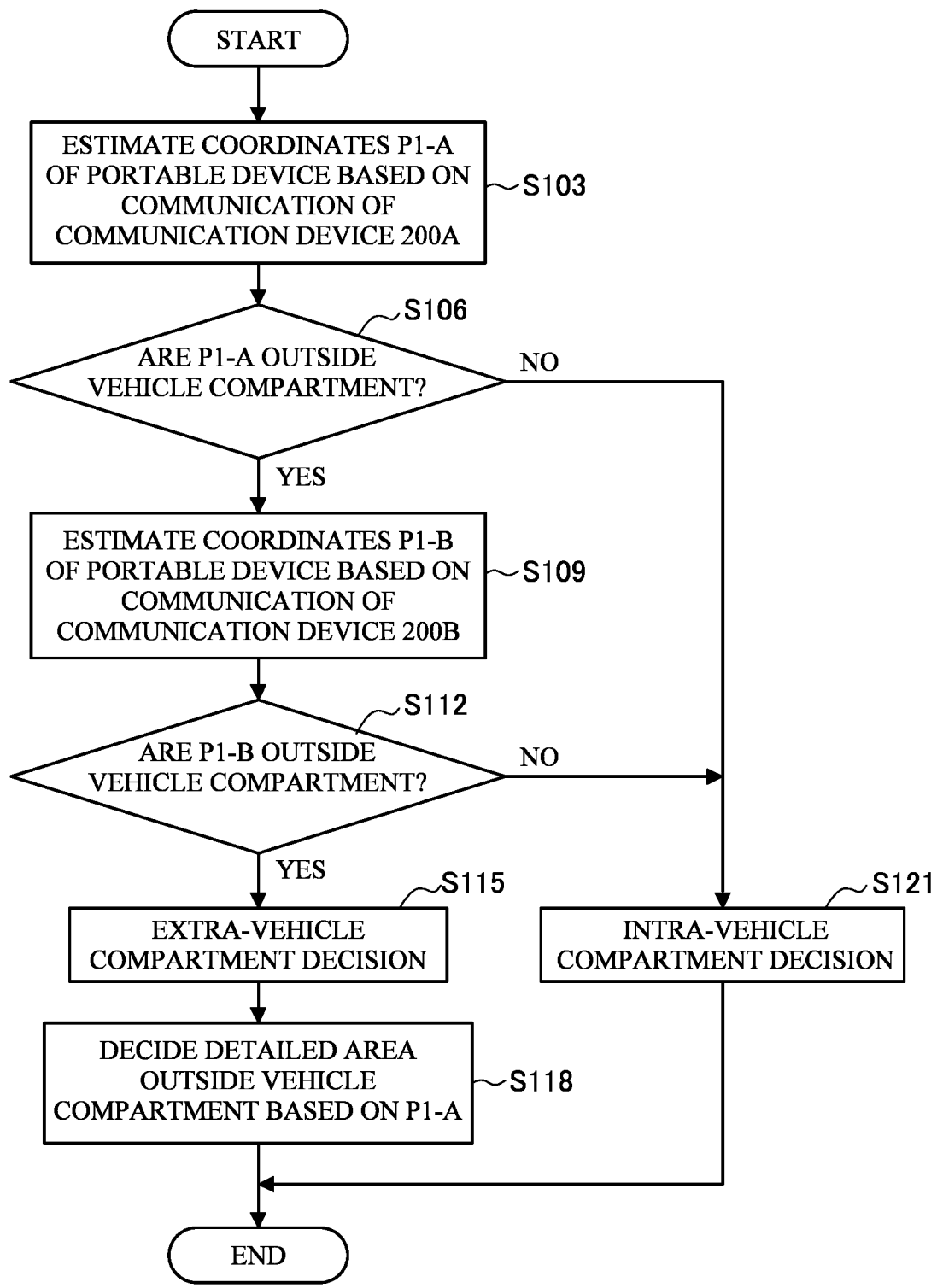
FIG. 4 is a flowchart illustrating an example of a flow of a position parameter estimation process executed by a control device according to the present embodiment.

FIG. 4 is a flowchart illustrating an example of a flow of a position parameter estimation process executed by the control device 300 according to the present embodiment.

As illustrated in FIG. 4, the control section 320 of the control device 300 first performs a distance measurement process and angle estimation based on information obtained by wireless communication performed between the communication device 200A and the portable device 100, and estimates coordinates P1-A (x, y, z) of the portable device 100 based on a calculated distance and angle (step S103).

Next, the control section 320 decides in which one of an inside of the vehicle compartment and an outside of the vehicle compartment the coordinates P1-A are (step S106).

Next, when it is decided that the coordinates P1-A are outside the vehicle compartment (step S106/Yes), the control section 320 performs a distance measurement process and angle estimation based on the information obtained by wireless communication performed between the communication device 200B and the portable device 100, and estimates coordinates P1-B (x, y, z) of the portable device 100 based on the calculated distance and angle (step S109).

Next, the control section 320 decides in which one of the inside of the vehicle compartment and the outside of the vehicle compartment the coordinates P1-B are (step S112).

Next, when it is decided that the coordinates P1-B are outside the vehicle compartment (step S112/Yes), the control section 320 finally decides that the portable device 100 exists outside the vehicle compartment (step S115). That is, when all estimation results based on the plurality of communication devices 200 decide the outside of the vehicle compartment, the control section 320 determines extra-vehicle compartment decision. Note that, although the two communication devices 200A and B are used as the plurality of communication devices 200, the present embodiment is not limit to this, and the number of the plurality of communication devices 200 may be three or more. In this case, too, when all estimation results based on all of the three communication devices 200 decide the outside of the vehicle compartment, the control section 320 determines extra-vehicle compartment decision.

On the other hand, when it is decided that the coordinates P1-A are inside the vehicle compartment (step S106/No), the control section 320 finally decides that the portable device 100 exists inside the vehicle compartment (step S121). Alternatively, when it is decided that the coordinates P1-B are inside the vehicle compartment (step S112/No), the control section 320 finally decides that the communication device 200B exists inside the vehicle compartment (step S121). That is, when even one of all estimation results based on the plurality of communication devices 200 decides the inside of the vehicle compartment, the control section 320 determines intra-vehicle compartment decision. Note that, although the two communication devices 200A and B are used as the plurality of communication devices 200, the present embodiment is not limit to this, and the number of the plurality of communication devices 200 may be three or more. In this case, too, when even one of all estimation results based on all of the three communication devices 200 decides the inside of the vehicle compartment, the control section 320 determines intra-vehicle compartment decision.

As described above, by devising the arrangement of the plurality of communication devices 200, it is possible to correctly decide that the portable device 100 is inside the vehicle compartment based on the communication device 200B even when it is wrongly decided that the portable device 100 is outside the vehicle compartment based on the communication device 200A even though the portable device 100 exists inside the vehicle compartment. Furthermore, when the portable device 100 exists outside the vehicle compartment, all estimation results estimate that the portable device 100 is outside the vehicle compartment, and the control section 320 can correctly decide that the portable device 100 is outside the vehicle compartment. Even when, for example, the steel plate that makes up the body of the vehicle 20 or the steel plate that makes up the door shields the direct wave from the portable device 100 located in an extra-vehicle compartment area in a lower direction of the glass window to the communication device 200B, a diffracted wave or a reflected wave can arrive at the communication device 200B. When position estimation is executed based on this diffracted wave or reflected wave, although coordinates different from the actual coordinates of the portable device 100 are estimated, it is possible to correctly decide that the portable device 100 is located at least outside the vehicle compartment.

Note that, when the outside of the vehicle compartment is determined, the control section 320 decides a detailed area of the outside of the vehicle compartment by using the coordinates P1-A based on the communication device 200A (step S118). As described above, when the portable device 100 exists outside the vehicle compartment, precision of a position is low in a case of the coordinates P1-B based on the communication device 200B, and it is preferable to use the coordinates P1-A to decide the detailed area.

Although the example of the flow of the process according to the present embodiment has been described above, the present embodiment is not limited to this. For example, the processes illustrated in step S103 and step S109 may be reversely performed, or may be performed in parallel. For example, the control section 320 may perform a distance measurement process, angle estimation, and intra/extra-vehicle compartment decision on each of the plurality of communication devices 200, and then perform final intra/extra-vehicle compartment decision. In this case, the control section 320 may perform the final intra/extra-vehicle compartment decision based on majority decision or reliability of the estimation results.

Furthermore, the control section 320 may perform control to sequentially perform wireless communication between each of the plurality of communication devices 200 and the portable device 100. When, for example, starting wireless communication between the communication device 200A and the portable device 100, and making extra-vehicle compartment decision, the control section 320 may next start wireless communication between the communication device 200B and the portable device 100, and perform a distance measurement process, angle estimation, and intra/extra-vehicle compartment decision.

Furthermore, the plurality of communication devices 200 may be two communication devices, or may be the three or more communication devices 200. The plurality of communication devices 200 may be the three or more communication devices 200 including, for example, at least the communication device 200A and the communication device 200B.

«5. Supplementary Explanation»

Although the preferred embodiment of the present invention has been described in detail with reference to the accompanying drawings, the present invention is not limited to this example. It should be understood by those who have common knowledge in the technical field to which the present invention belongs that it is obvious that various change examples or alteration examples can be arrived at within the scope of the technical idea recited in the claims, and these change examples and alteration examples also naturally belong to the technical scope of the present invention.

For example, although the above embodiment has described the example where the control device 300 calculates the distance measurement value, the present invention is not limited to this example. For example, the communication device 200 may calculate the distance measurement value. In this case, the control device 300 reports the information that indicates ΔT2 to the communication device 200.

Furthermore, although the above embodiment has described that the information that indicates the time ΔT1 from the reception time of the first distance measurement signal to the transmission time of the second distance measurement signal in the portable device 100 may be included in the data signal and transmitted to the communication device 200, the present invention is not limited to this example. The data signal only needs to include information related to the reception time of the first distance measurement signal and the transmission time of the second distance measurement signal.

Furthermore, although the above embodiment has described the example where the communication device 200 transmits the first distance measurement signal, the present invention is not limited to this example. For example, the portable device 100 may transmit the first distance measurement signal. In this case, when receiving the first distance measurement signal, the communication device 200 transmits the second distance measurement signal as a response to this first distance measurement signal. Furthermore, the communication device 200 transmits the data signal that includes the information that indicates the time ΔT1 from the reception time of the first distance measurement signal to the transmission time of the second distance measurement signal. On the other hand, the portable device 100 calculates the distance measurement value based on the time ΔT2 from the transmission time of the first distance measurement signal to the reception time of the second distance measurement signal, and the time ΔT1 included in the data signal. Note that the time ΔT1 may be known for the portable device 100.

Furthermore, although the above embodiment has described the example where the authenticatee is the portable device 100, and the authenticator is the communication device 200, the present invention is not limited to this example. Roles of the portable device 100 and the communication device 200 may be reserve, or may be dynamically switched. Furthermore, the communication devices 200 may measure a distance therebetween and authenticate each other.

Furthermore, although the distance is measured from the transmission time and the reception time of one round-trip communication between the portable device 100 and the communication device 200 according to the above embodiment, the present invention is not limited to this example. For example, a distance may be measured from a transmission time and a reception time of one-and-half round trip communication between the portable device 100 and the communication device 200. According to the one-and-half round trip communication between the portable device 100 and the communication device 200, for example, the portable device 100 first transmits a first signal, then the communication device 200 transmits a second signal in response to reception of the first signal, and the portable device 100 then transmits a third signal to the communication device 200 in response to reception of the second signal. The control device 300 can measure the distance between the portable device 100 and the communication device 200 from a transmission time and a reception time of each signal.

For example, although the above embodiment has described the example where the distance measurement value is calculated based on the propagation time, the present invention is not limited to this example. For example, a distance measurement value may be calculated based on a radio field intensity.

For example, although the above embodiment has described the example where the UWB is used as the wireless communication standards, the present invention is not limited to this example. In an example, wireless communication standards that use a signal of the RF band and a signal of the LF band may be used. In another example, wireless communication standards that use Wi-Fi (registered trademark), Near Field Communication (NFC), and infrared ray may be used.

For example, although the above embodiment has described the example where the control device 300 is configured as a separate device from each of the plurality of communication device 200 and is mounted on the vehicle 20, the present invention is not limited to this example. In an example, a communication unit including the control device 300 and each of the plurality of communication device 200 may be mounted on the vehicle 20. Furthermore, the function of the control section 320 of the control device 300 may be provided to the control section 220 of each of the plurality of communication device 200. Furthermore, the control device 300 may be included in the portable device 100. Furthermore, the control device 300 may be included in another device other than the portable device 100 and each of the plurality of communication device 200.

For example, although the above embodiment has described the example where the communication device 200 and the control device 300 are mounted on the vehicle, the present invention is not limited to this example. The communication device 200 and the control device 300 may be mounted on arbitrary movable bodies such as airplanes, ships, drones, and robots other than vehicles. In this regard, the movable bodies are devices that move.

For example, although the above embodiment has described the example where the present invention is applied to a smart entry system, the present invention is not limited to this example. The present invention is applicable to arbitrary systems that perform wireless communication. For example, objects used by the user include drones, vehicles, ships, airplanes, buildings (such as houses), robots, lockers, and home electric appliances. Furthermore, the present invention is applicable to, for example, pairs of two arbitrary devices among portable devices, vehicles, ships, airplanes, smartphones, drones, buildings, robots, lockers, and home electric appliances. Note that the pairs may include the two devices of the same type, and include the two devices of different types. In this case, one device operates as an authenticator side device, and an other device operates as an authenticatee side device.

Note that a series of processes of each device described in this description may be realized by using one of software, hardware, and a combination of the software and the hardware. Programs that configure the software are stored in advance in, for example, recording media (non-transitory media) provided inside or outside each device. Furthermore, each program is read on an RAM when, for example, executed by a computer, and is executed by a processor such as a CPU. The above recording media are, for example, a magnetic disk, an optical disk, a magneto-optical disk, and a flash memory. Furthermore, the above computer programs may be distributed via, for example, a network without using the recording media.

Furthermore, the process described using the flowchart and the sequence diagram in this description may not be necessarily executed in illustrated order. Some process steps may be executed in parallel. Furthermore, additional process steps may be adopted, or part of process steps may be omitted.

Furthermore, the effect described in this description is merely explanatory or exemplary, and is not limitative. That is, together with the above effect or instead of the above effect, the technology according to the present invention exhibits other effects that are obvious for those who have common knowledge in the technical field from the disclosure of this description.

REFERENCE SIGNS LIST 1 system
100 portable device 110 wireless communication section
120 control section
130 storage section
20 vehicle
200 communication device
210 wireless communication section
220 control section
230 storage section
240 intra-vehicle communication section
300 control device
310 intra-vehicle communication section
320 control section
330 storage section

The invention claimed is:

1. A control device comprising a control section configured to obtain a distance measurement value, and estimate a relative position of a position changeable type communication device with respect to a target space based on the distance measurement value, the distance measurement value being obtained when at least one of a plurality of position fixed type communication devices and the position changeable type communication device perform wireless communication, and indicating a distance between the at least one position fixed type communication device and the position changeable type communication device, the plurality of position fixed type communication devices including a first position fixed type communication device that is fixed inside a target space that is a space partitioned by an object and to at least one part included in the target space, and a second position fixed type communication device that is fixed to a part different from the at least one part, and the relative position of the position changeable type communication device with respect to the target space being changeable.

2. The control device according to claim 1,
wherein the control section obtains an angle at which a signal transmitted by the wireless communication from the position changeable type communication device arrives at the position fixed type communication device, and estimates the relative position based on the obtained angle and the distance measurement value.

3. The control device according to claim 1,
wherein the control section decides whether or not the position changeable type communication device is located inside the target space based on an estimation result of the relative position of the position changeable type communication device with respect to the target space.

4. The control device according to claim 3,
wherein, when at least one or more of the estimation results estimate that the relative position of the position changeable communication device is inside the target space, the control section decides that the position changeable type communication device is located inside the target space.

5. The control device according to claim 4, wherein the second position fixed type communication device is fixed to a part that has a perpendicular or facing positional relationship with a part to which the first position fixed type communication device is fixed.

6. The control device according to claim 4,
wherein the at least one part included in the target space is a part that partitions the target space.

7. The control device according to claim 6,
wherein the part that partitions the target space is a ceiling part or a floor part.

8. The control device according to claim 4, wherein
the first position fixed type communication device is fixed to a position that is closer to a ceiling part than to a floor part, the ceiling part being an other part that partitions the target space, and the floor part being one of parts that partition the target space, and
the second position fixed type communication device is fixed to a position closer to the floor part than to the ceiling part.

9. The control device according to claim 8, wherein
the first position fixed type communication device is arranged at the ceiling part, and
the second position fixed type communication device is arranged at the floor part.

10. The control device according to claim 8, wherein
the first position fixed type communication device is arranged at the ceiling part, and
the second position fixed type communication device is arranged at a side part that connects the ceiling part and the floor part.

11. The control device according to claim 4,
wherein the plurality of the position fixed type communication devices are mounted on a movable body.

12. The control device according to claim 11,
wherein the first position fixed type communication device and the second position fixed type communication device are arranged at positions at which the first position fixed type communication device and the second position fixed type communication device face each other sandwiching a seat provided inside the movable body.

13. The control device according to claim 1,
wherein the first position fixed type communication device and the second position fixed type communication device are fixed according to a positional relationship that a straight line that connects the first position fixed type communication device and the second position fixed type communication device passes a specified shield that exists inside the target space.

14. The control device according to claim 1, wherein
the plurality of the position fixed type communication devices are mounted on a vehicle,
the position changeable type communication device is a device that a user who uses the vehicle carries to use, and
the target space is a vehicle compartment that is a space provided to the vehicle for the user to get on the vehicle.

15. The control device according to claim 1,
wherein, during the wireless communication performed by the position fixed type communication device and the position changeable type communication device to obtain the distance measurement value, a signal that uses an Ultra-Wide Band (UWB) is transmitted and received.

16. A control system comprising:
a plurality of position fixed type communication devices that include a first position fixed type communication device and a second position fixed type communication device, the first position fixed type communication device being fixed inside a target space that is a space partitioned by an object and to at least one part included in the target space, and the second position fixed type communication device being fixed to a part different from the at least one part; and
a control device configured to obtain a distance measurement value, and estimate a relative position of a position changeable type communication device with respect to a target space based on the distance measurement value, the distance measurement value being obtained when at least one of the position fixed type communication devices and the position changeable type communication device perform wireless communication, and indicating a distance between the at least one position fixed type communication device and the position changeable type communication device, and the relative position of the position changeable type communication device with respect to the target space being changeable.

17. A non-transitory computer readable storage medium that stores a program causing a computer to function as a control section configured to obtain a distance measurement value, and estimate a relative position of a position changeable type communication device with respect to a target space based on the distance measurement value, the distance measurement value being obtained when at least one of a plurality of position fixed type communication devices and the position changeable type communication device perform wireless communication, and indicating a distance between the at least one position fixed type communication device and the position changeable type communication device, the plurality of position fixed type communication devices including a first position fixed type communication device that is fixed inside a target space that is a space partitioned by an object and to at least one part included in the target space, and a second position fixed type communication device that is fixed to a part different from the at least one part, and the relative position of the position changeable type communication device with respect to the target space being changeable.

* * * * *